US007003102B2

(12) United States Patent
Kiko

(10) Patent No.: US 7,003,102 B2
(45) Date of Patent: Feb. 21, 2006

(54) TELECOMMUNICATIONS GATEWAY AND METHOD

(75) Inventor: Frederick J. Kiko, Carlsbad, CA (US)

(73) Assignee: Pulse Engineering, Inc., San Diego, CA (US)

( * ) Notice: Subject to any disclaimer, the term of this patent is extended or adjusted under 35 U.S.C. 154(b) by 651 days.

(21) Appl. No.: 09/975,142

(22) Filed: Oct. 10, 2001

(65) Prior Publication Data

US 2003/0068033 A1 Apr. 10, 2003

(51) Int. Cl.
*H04M 1/00* (2006.01)

(52) U.S. Cl. ............... 379/413; 379/90.01; 379/102.04

(58) Field of Classification Search ................ 379/413, 379/90.01, 102.04
See application file for complete search history.

(56) References Cited

U.S. PATENT DOCUMENTS 6,658,108 B1 * 12/2003 Bissell et al. ............... 379/413

* cited by examiner

*Primary Examiner*—Jefferey F. Harold
(74) *Attorney, Agent, or Firm*—Gazdzinski & Associates

(57) ABSTRACT

An improved system and associated components for providing reliable power supply and interconnectivity for digital subscriber line (DSL) applications at sites remote from the central office (CO). The system comprises a line power unit in communication with a subscriber-installable gateway module, the latter incorporating a power extraction circuit adapted to extract power from the Telco line. Home phone network (HPN), homeplug, and wireless modules are also provided within the gateway to permit connectivity between other electronic components within the subscriber's site. Subscriber-installable adapter modules which extract power and perform line interface functions for the various jacks throughout the site are also disclosed. Methods for installing and operating the aforementioned components are also described.

39 Claims, 10 Drawing Sheets

TELECOMMUNICATIONS GATEWAY AND METHOD

BACKGROUND OF THE INVENTION

1. Field of the Invention

The present invention relates generally to electronics used in telecommunications applications, and particularly to an improved apparatus and methods for installing and operating a digital subscriber line (DSL) system.

2. Description of Related Technology

As is well known, Asymmetric Digital Subscriber Line (ADSL), and Very high bit rate Digital Subscriber Line (VDSL) can provide broadband access to various nodes (e.g., homes and small offices) “piggybacked” on the existing telephone lines. Currently, data rates of up to 8 Mbit/s are possible with ADSL. VDSL utilized on shorter loops can provide data rates up to 50 Mbit/s.

More recently, efforts have been made to provide additional voice lines over DSL (so-called “voice-over-DSL” or VoDSL). Using this approach, it is possible to provide many dial tone channels over DSL. However, a significant concern under such approaches is continuity of service and reliability of electrical power to the various subscriber entities served by the DSL infrastructure. Typical prior art ADSL/gateway approaches (FIG. 1) require local power, or local backup power, to supply power during outages. These approaches are comparatively costly, thereby raising the cost of providing DSL service to the service provider and/or subscriber. Additionally, backup power sources are not always (properly) maintained or available, and thus not entirely reliable.

Another consideration relates to data networking at the subscriber’s site. Wireless interfaces and home phone networking (HPN) systems have become increasing prevalent. Wireless systems, including those compliant with IEEE Standards 802.11A and 802.11B or the more recent Bluetooth/3G standards, are designed to allow wireless interface between one or more mobile or remote units such as laptop computers, personal digital assistant (PDA), or telephone, without the need for telephone line infrastructure or other networking devices. These systems are often characterized by a local gateway or base station which facilitates two-way communication between the mobile/remote unit(s) and the network to which the gateway is connected, as well as between individual mobile/remote units.

Home phone networking (HPN) systems, also commonly referred to as “HomePNA”, allow data interchange between various locations within a localized site such as a residence or small business. HPN systems are generally based on the specifications developed by the Home Phone Networking Alliance (HPNA). HPNA Standard 1.0, the original version of the standard, sets forth specifications for systems operating at 1 Mbps. A more version of the standard, HPNA 2.0, is based on technology developed by, inter alia, Broadcom, and operates at a faster data rate of 10 Mbps. Even faster variants are presently being contemplated. Advantages of HPN systems include ease of installation, low cost, the ability to have multiple nodes on the network, compatibility with existing networking and PC technologies, and effectively constant data rate (largely independent of concurrent telephone voice signals). HPN systems also have the advantage of obviating expensive and complex server, hub, and router devices. HPN systems require that a phone jack be physically located near the desired location of each computer, gateway, or other network node, and generally has limitations on the length of interposed wiring between the various HPN nodes.

Despite there advantages, the foregoing wireless and HPN systems must be supplied with electrical power derived from the local power system (i.e., utility provided power service), or from a separate subscriber-maintained power supply. Loss of electrical service interrupts wireless/HPN system operation unless an uninterruptible power supply (UPS) or similar device is maintained, the latter representing a significant cost and maintenance issue for the subscriber.

Another recent initiative known as HomePlug™ seeks to standardize the use of existing power lines present in subscriber homes or offices as a means of transferring data between various network nodes at the site. Power lines are currently a pervasive home networking medium, and are available worldwide, thereby affording the use of multiple outlets in a given structure at a lower cost per connection point. Additionally, the convenience of connecting any device through a power outlet has a certain attraction.

Despite the foregoing initiatives and emergence of VoDSL, no technology at present makes effective use of the existing power line infrastructure and telecommunications wiring infrastructure to allow for interoperability between HPN, wireless, HomePlug-capable, and traditional data networking systems, while also addressing the issue of electrical power continuity.

Based on the foregoing, an improved apparatus and method of providing reliable, continuous power to the subscribers of DSL systems (including VoDSL systems) is needed. Such improved apparatus and methods would (i) be readily implemented by the subscriber, (ii) make use of existing telecommunications and/or power line infrastructure, and (iii) be compatible with a variety of different device types and configurations present at the subscriber site, such as standard telephones, multi-line digital telephones using home phone network (HPN) systems, wireless, and HomePlug compatible devices.

SUMMARY OF THE INVENTION

The present invention satisfies the aforementioned needs by providing an improved digital subscriber line communications system and associated components, and methods of installing and operating the same.

In a first aspect of the invention, an improved line-powered digital subscriber line system is disclosed. In one exemplary embodiment, the system comprises a digital subscriber line access multiplexer (DSLAM), line power converter unit (LPCU), self-install line power gateway module, and one or more self-install jack adapter modules. The gateway and jack adapter modules are located at the subscriber site and plugged into the existing telecommunications jacks, with the gateway also having HPN, wireless, and HomePlug (or similar) modules being connected to the local power line (such as via a standard wall plug). This configuration provides both reliable power to each phone jack/node at the subscriber site via the existing telephone wiring, and connectivity to any number of other devices at the site via the existing power line infrastructure (and HomePlug module). The gateway module can advantageously be line powered from the serving central office (CO), or from the remote DSLAM. The line powering is accomplished by replacing the conventional CO splitter with the aforementioned line-powering converter unit (LPCU), and eliminating the prior art plain-old telephone system (POTS) connection to the CO switch line circuit. Using this system, the subscriber’s line has both the DSL signal with VoDSL plus the DC power signal from the LPCU, but no telephone ringing and battery feed signals from the CO. In a second aspect of the invention, an improved DSL multiplexer (DSLAM) module for use with the foregoing system is disclosed. In one exemplary embodiment, the improved DSLAM comprises a backbone connection and multiplexer having multiple channels connected to the various subscriber lines, and is configured for extended bandwidth capability (e.g., from 200 Hz up to 25 KHz) resulting in longer range and/or faster data rates.

In a third aspect of the invention, an improved line power conversion unit (LPCU) is disclosed. In one exemplary embodiment, the LPCU comprises a low-frequency splitter apparatus, power control module, DC/DC converter unit, and ground fault detector. The LPCU further includes a line interface to the aforementioned line power gateway (i.e., via the Telco subscriber line), as well as a second interface to the DSLAM. Control signals generated by the remote gateway module are fed back to the LPCU to interactively control the provision of DC power over the subscriber line.

In a fourth aspect of the invention, an improved DSL gateway apparatus is disclosed. In one exemplary embodiment, the gateway apparatus comprises a line power extractor unit, controller, DSL circuit, and HPN interface unit. The power extractor extracts DC power from the Telco subscriber line for use by the gateway and any devices coupled thereto. Additionally, a wireless interface, such as that compliant with IEEE Standard 802.11B, is included with the gateway apparatus in order to provide a wireless data link to other equipment such as portable laptop computers, cordless telephones, etc.

In a fifth aspect, an improved jack adapter module is disclosed. In one exemplary embodiment, the adapter comprises a power extractor circuit, SLIC/power circuit, and home phone network (HPN) interface circuit, interposed between a conventional RJ-type wall jack and extension device such as a standard telephone, HPN gateway, or multi-line digital telephone. The module further includes an auto-sensing feature which determines the type of extension device plugged into the module jack, and the appropriate operating mode for the adapter module based on the sensed configuration. The adapter module is further made lockable with respect to the wall jack, such that it frustrates inadvertent or casual removal of the adapter module.

In a sixth aspect of the invention, an improved method of installing the foregoing system and associated components is disclosed. The method generally comprises: determining scope and location of telecommunications wiring within the site; positioning at least one gateway module in a location having access to both the telecommunications wiring (jacks) and a local power supply; positioning one or more adapter modules in respective ones of said jacks; and plugging in one or more extension devices into respective ones of the adapter modules.

BRIEF DESCRIPTION OF THE DRAWINGS

The features, objectives, and advantages of the invention will become more apparent from the detailed description set forth below when taken in conjunction with the drawings, wherein.

DETAILED DESCRIPTION OF THE PREFERRED EMBODIMENT

Figure 1:
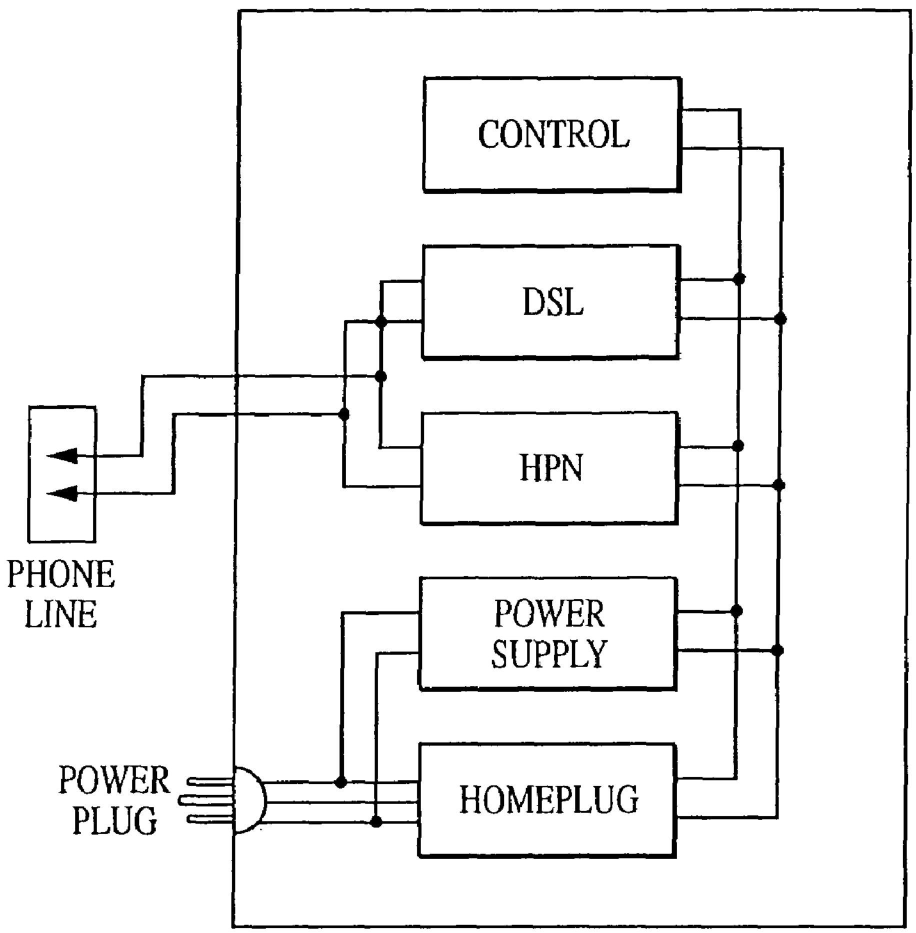
FIG. 1 is a block diagram of a typical prior art ADSL installation in a home or small business environment, including power supply thereto.

Reference is now made to the drawings wherein like numerals refer to like parts throughout.

It is noted that while portions of the following description is cast primarily in terms of RJ-type connectors and associated modular plugs of the type well known in the art, the present invention may be used in conjunction with any number of different connector types. Accordingly, the following discussion of the RJ connectors is merely exemplary of the broader concepts.

As used herein, the term “signal conditioning” or “conditioning” shall be understood to include, but not be limited to, signal voltage transformation, filtering and noise mitigation or elimination, current limiting, sampling, signal processing, and time delay.

As used herein, the term “integrated circuit” shall include any type of integrated device of any function, whether single or multiple die, or small or large scale of integration, including without limitation applications specific integrated circuits (ASICs), field programmable gate arrays (FPGAs), digital processors (e.g., DSPs, CISC microprocessors, or RISC processors), and so-called “system-on-a-chip” (SoC) devices.

Lastly, the term “homeplug” as used herein is meant specifically to include devices and systems compliant with the HomePlug™ Powerline Alliance Version 1.0 Specification for powerline-based home networks, and generally to include all other comparable devices adapted for powerline networking.

Overview

As previously discussed, reliability of power supply is a significant issue for ADSL systems. To address this reliability issue, the ADSL unit of the present invention is married with (i) a power recovery circuit, (ii) a home phone network (HPN) interface module device (using for example the existing house or building wiring), and (iii) a home power plug interface module, all coupled to the same Telco line. This combination of components is referred to generally herein as the gateway module, described in further detail below. A wireless interfaces module (such as those compliant with IEEE Std. 802.11B or the "Bluetooth" 2.4 GHz wireless interface standard) is also optionally provided to facilitate wireless data interchange between the system and a remote or mobile device such as a laptop computer, personal digital assistant (PDA), cellular or cordless telephone, and the like.

The line powered gateway module of the present invention can be advantageously installed by the subscriber by simply locating a power plug (e.g., 115 VAC, 60 Hz single-phase outlet) in physical proximity to a telephone jack (e.g., RJ-type modular jack), and plugging the gateway module into the power plug, with a cord running to the closest telephone jack. Instead of plugging in signal conditioning devices such as micro-filters for each phone as in a typical prior art DSL installation, the present invention utilizes one or more specially configured adapter modules which are plugged into respective phone jacks at the installation premises, and which receive extension devices (e.g., telephones) via an extension port on the adapter modules.

The aforementioned adapter module advantageously extracts its power from the wall jack as the ADSL unit does, and provides power to both an associated HPN unit (e.g., integrated circuit specifically adapted for home phone network applications) and low voltage subscriber's line interface circuit (SLIC) for a standard type telephone.

The adapter module(s) also is/are configured to provide an automatic jack sensor circuit that automatically senses the type or configuration of the device attached to the new derived port (e.g., a regular phone, an HPN device, or a new multi-line digital phone), and applies the correct interface for the sensed device. In this capacity, the adapter module is self-configuring, thereby providing for ease of installation and use, especially when switching between various types of subscriber extension devices.

The combination of the HPN signals on the existing house or building telephone wiring, the RF signals associated with the air interface, and the signals present on the homeplug (or other suitable power line technologies) running through the structure, allows ready data connection and interchange in any physical location within the structure (and potentially outside the structure, consistent with the limitations of the air interface). Any computer, notebook, PDA, or other data capable device can easily be connected around the structure via either HPN or wireless interface. Similarly, printers or other computer peripherals can also be connected and shared by all computers or other networked devices using the HPN circuitry by simply plugging into one of the installed telephone jacks present in the structure.

Other miscellaneous devices can be connected to the gateway module (and thus made available for all computers/devices on the network) via the house power wiring using devices equipped with homeplug or comparable interfaces. Any homeplug equipped devices such as video cameras, alarm devices, coffee makers, refrigerators, intercoms, etc. are automatically connected the gateway module of the present invention by plugging the device into the wall power receptacle.

In sum, using the system of the present invention, the entire house or structure (or even series of structures) can be rapidly and easily interconnected via a simple self-installation by the user with no additional wiring, cables, etc.

"Self-Install" Gateway System

Figure 2:
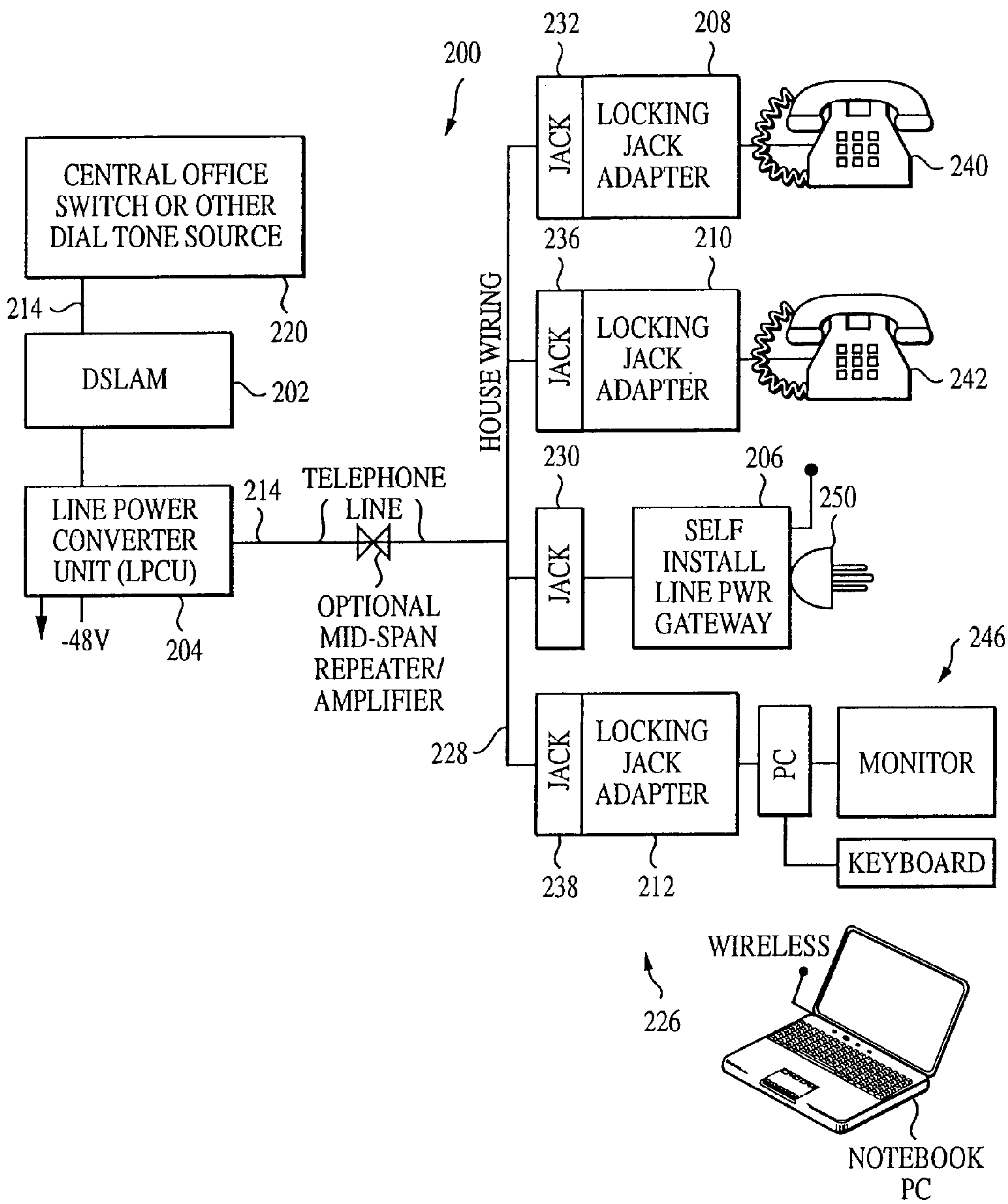
FIG. 2 is a block diagram of one exemplary embodiment of the gateway system of the present invention.

Referring now to FIG. 2, a first exemplary embodiment of the self-install line powered gateway system 200 of the present invention is described in detail. As shown in FIG. 2, the system generally comprises a digital subscriber line access multiplexer (DSLAM) 202, a line power converter unit (LPCU) 204, a gateway module 206, and one or more adapter modules 208, 210, 212. The system 200 is connected via Telco line 214 from the DSLAM 202 to the Internet Service Provider (ISP) and/or indirectly to a central office (CO) telecommunications switch 220 (or other dial tone source) of the type well understood in the telecommunications art. A direct current (DC) power supply 222, such as from one or more conventional batteries, is provided for the LPCU 204, which in the illustrated embodiment provides a minus 48 VDC to the LPCU for use therein as described in greater detail with respect to FIG. 3, although other values may be substituted. The LPCU 204 is accordingly connected to the wiring within the designated installation site 226 (e.g., home, small business, etc.) via a conventional installed analog telephone line 214.

An interposed signal repeater/amplifier 216 is also optionally provided within the telephone line 224 to enhance signal quality over longer distances or particularly noisy pathways if required. Such repeaters and amplifiers are well understood in the telecommunications arts, and accordingly are discussed further herein.

The installed telecommunications wiring 228 within the site 226 is used as the basis for interconnection and communication between the various components 206, 208, 210, 212 of the system 200. Specifically, the gateway module 206 is connected to the telecommunications wiring 228 via a first modular jack 230 (here, the RJ-type, yet others may be readily substituted), while the one or more adapter modules 208, 210, 212 are interfaced with the wiring 228 via other respective jacks 232, 236, 238 located throughout the site 226. The extension devices 240, 242, 244 are accordingly plugged into respective adapter modules 208, 210, 212 as described in greater detail below, thereby providing signal continuity between the ISP or Telco switch 220 and the various extension devices 240, 242, 244. The gateway module 206 is also plugged into a nearby wall power outlet, such as the 115 VAC, 60 Hz single phase variety of the type in widespread use today. It will be recognized, however, that other types of power sources may be used either in the alternative or in conjunction with the foregoing, including for example 220 VAC, 50 Hz, single phase. As will be described in greater detail below, the gateway module 206 advantageously extracts power from the telecommunications wiring 228, as do the various adapter modules 208, 210, 212 via their own respective power extraction circuits.

It will be noted that the DSLAM 202 of the illustrated embodiment differs from the standard prior art DSLAM in that the DSL of the present DSLAM 202 is also adapted to utilize the desirable 200 Hz–25 KHz bands for longer range (or faster data rates), plus the new or derived phone lines. Specifically, the DSLAM 202 of the illustrated embodiment utilizes a high-pass filter tuned to start at 200 Hz versus 25 KHz, as well as additional software.

The LPCU 204 of the embodiment of FIG. 2 replaces the splitters typically found in prior art configurations in the central office, and converts the −48V input power signal 222 to a higher voltage (up to +/−135 V) to provide the gateway module 206 with up to 12 Watts of power. The LPCU 204 in the illustrated embodiment comprises a current source of approximately 60–100 mA, and is partially under control of the gateway module's power extractor unit 406 (see discussion of FIG. 4) in order to adjust for the desired power at the gateway module(s) 206.

Figure 3:
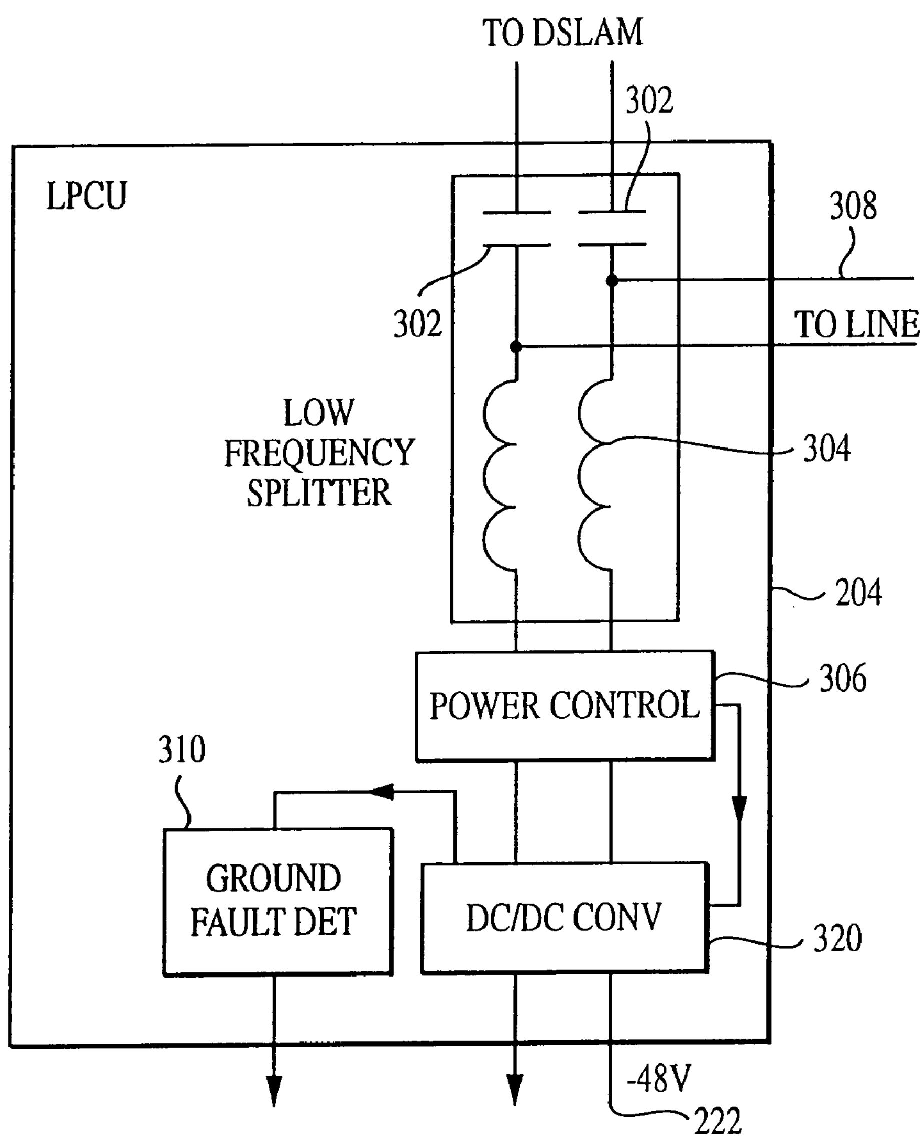
FIG. 3 is a block diagram and partial schematic of one embodiment of the line power converter unit (LPCU) according to the invention.

FIG. 3 shows the internal details of the LPCU 204 of the system 200 of FIG. 2. The DSLAM signals pass through the low frequency splitter/combiner capacitors 302 to the subscriber's line. The power feed current passes through the feed inductors 304 to the subscriber's line 308. The inductance values of the feed inductors 304 of the present embodiment are selected to achieve a resonance condition for the best hi-pass/low-pass response at 200 Hz, although it will be appreciated that other frequencies and/or inductor selection criterion may be substituted if desired. A component of the total inductance is provided by the DC/DC converter circuit 320, so as to minimize the inductors cost and size, thereby allowing the LPCU 204 to be smaller and less costly to manufacture. The ground fault detection circuitry 310 of the LPCU 204 senses any ground-based current, and trips the converter output in the feed circuit when a fault is detected (such as from a ground occurring when someone touches the line 308). The LPCU 204 is advantageously adapted to be flexible in supplying both minimum power for short loops and providing elevated voltage and power for the longer loops (and long loops with mid-span line powered repeaters or amplifiers). Specifically, if insufficient voltage is detected at the gateway's power extractor unit, the control circuitry sends a signal to the LPCU to increase the power provided. The DC/DC converter 320 included within the LPCU 204 also regulates the positive voltage applied to the subscriber's line 308 to minimize the corrosion rate of the copper used within that line. The polarity of the line power can optionally be reversed periodically to minimize the corrosion rate.

Figure 4:
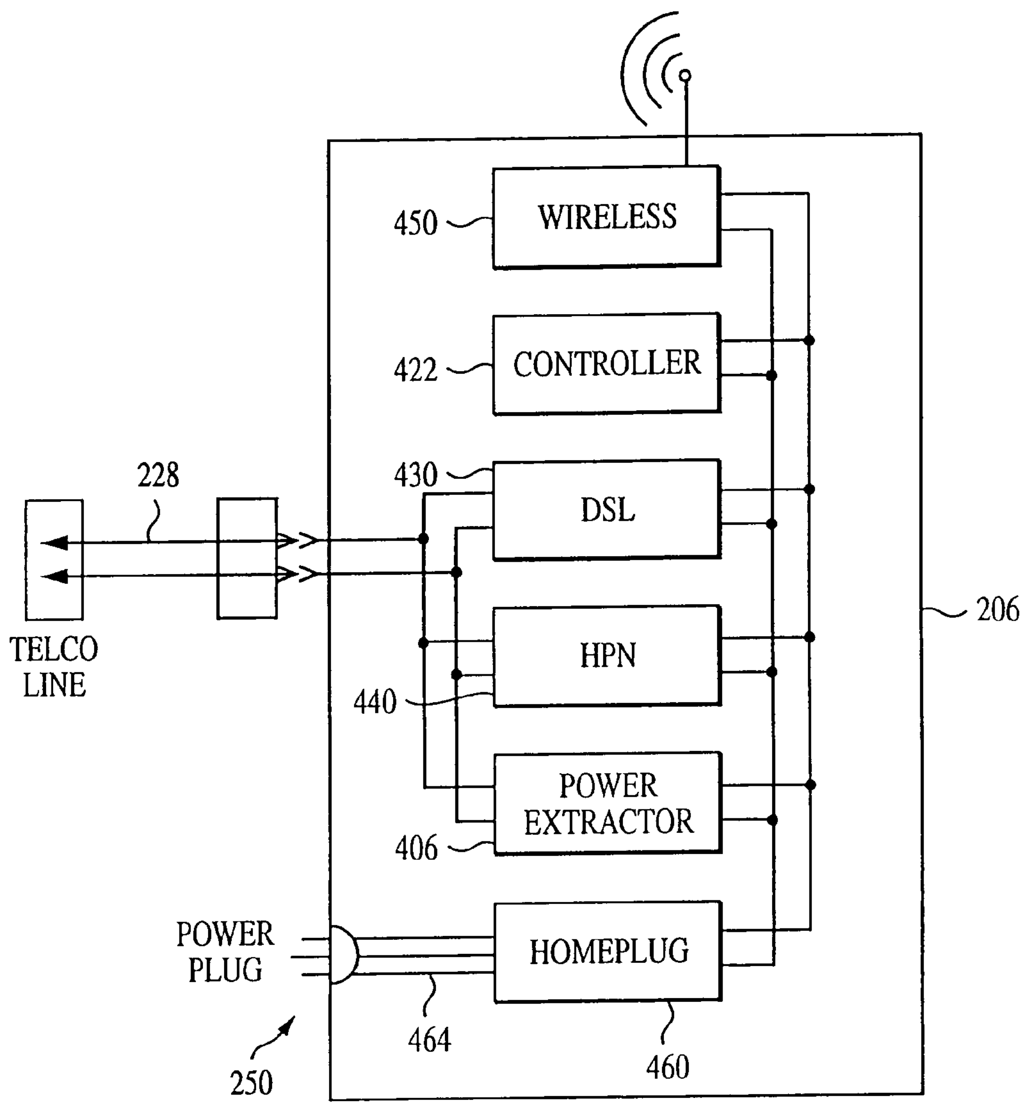
FIG. 4 is a block diagram and partial schematic of one embodiment of the DSL gateway unit according to the invention.

Referring now to FIG. 4, one exemplary embodiment of the gateway module 206 of the invention is described in detail. The gateway module 206 includes all of the technologies needed to network the site 226. Specifically, the gateway 206 includes a line power extractor block (LPEB) 406 which regulates the tip/ring (T/R) line voltage to approximately 72V in the illustrated embodiment (or alternatively some other voltage adapted for long range applications), and extracts power for the DSL module 430, HPN module 440, and wireless interface 450 and homeplug circuitry 460 if so equipped. The gateway module 206 may also communicate with the LPCU 204 to adjust the magnitude of the power provided thereby as required for various loop lengths and number of jack adapters 208, 210, 212. A low frequency modulation of the load current triggers an increase or decrease in feed power, although it will be recognized that other approaches may be utilized. The gateway module 206 further includes a controller 422 that manages all the states, features, and data flow of the system. In the illustrated embodiment, the controller 422 is physically part of the DSL modem chip (described below), although it will be recognized that discrete components or circuits may be used in place of the integrated circuits if desired.

The DSL module 430 of the gateway module 206 comprises a conventional DSL modulator/demodulator apparatus of the type well know in the telecommunication arts, which is further adapted to use the added 200 Hz–25 khz bandwidth previously described provided by the system configuration to generate multiple telephone dial tone circuits, while not taking bandwidth away from the original DSL modem channel. The DSL module 430 of the illustrated embodiment comprises an integrated circuit chipset (such as the Wildwire® ADSL modem chipsets manufactured by Lucent Technologies or the Alcatel DynaMiTe™ DSL chipset, although other chipsets may be used). The use of such IC chipsets affords the advantages of low cost and space savings, as well as integrating the aforementioned control features associated with the controller 422.

As shown in FIG. 4, the gateway module 206 further comprises an HPN module 440 of the type well understood in the networking arts, which interfaces with the DSL module 430 in order to couple data from the DSL to the home network over the installed telephone lines 228. This arrangement allows the generated or "derived" phone lines to be routed over the telephone wiring 228 to any phone jack at the site 226.

Also (optionally) included in the gateway module 206 is a wireless module 450 which communicates to any remote module within or proximate to the site 226 (or for that matter with physically remote devices via a local interface) using the antenna in the gateway's wireless module 450, such as in a notebook computer or video monitor. Any number of different wireless transmission methodologies may be employed to transfer data between these entities including, inter alia, point to point transmission via the Infrared Data Association's ("IrDA") infrared based wireless transmission standard; wireless radio frequency ("RF") based local area network ("LAN") connections based on the IEEE 802.11A or 802.11B LAN access standards, or the Home RF Shared Wireless Access Protocol. The construction and operation of each of these air interfaces is well known in the communications arts, and accordingly are not described further herein.

In another embodiment, a "Bluetooth" wireless interface (or alternatively, other so-called "3G" (third generation) communications technology) is utilized for transferring data between the gateway module 206 and mobile or remote devices, and/or between the PC extension device and its peripherals/accessories. Specifically, in the former case, the wireless module 450 of the gateway 206 comprises a transceiver and modulator device (not shown) used in the form of an SoC integrated circuit. The Bluetooth topology supports both point-to-point and point-to-multipoint connections. Multiple "slave" devices can be set to communicate with a "master" device. In this fashion, the gateway module 206 of the present invention, when outfitted with a Bluetooth or comparable wireless suite, may communicate directly with other Bluetooth compliant mobile or fixed devices including the subject's cellular telephone, PDA, notebook computer, or desktop computer.

Bluetooth-compliant devices, inter alia, operate in the 2.4 GHz ISM band. The ISM band is dedicated to unlicensed users, including medical facilities, thereby advantageously allowing for unrestricted spectral access in home or small office environments of the type in which the present invention is especially useful.

The modulator of the SoC device previously described uses one or more variants of frequency shift keying, such as Gaussian Frequency Shift Keying (GFSK) or Gaussian Minimum Shift keying (GMSK) of the type well known in the art to modulate data onto the carrier(s), although other types of modulation (such as phase modulation or amplitude modulation) may be used.

Spectral access of the device can be accomplished via frequency divided multiple access (FDMA), although other types of access such as frequency hopping spread spectrum (FHSS), direct sequence spread spectrum (DSSS, including code division multiple access) using a pseudo-noise spreading code, or even time division multiple access may be used depending on the needs of the particular application and site 226.

An exemplary SoC is the SiW1502 Radio Modem IC manufactured by Silicon Wave Corporation of San Diego, Calif., a low-power consumption device with integrated RF logic and Bluetooth protocol stack adapted for Bluetooth applications. The device is a fully integrated 2.4 GHz radio transceiver with a GFSK modem contained on a single chip. The SiW1502 chip is offered as a stand alone IC or, may be obtained with the Silicon Wave Odyssey SiW1601 Link Controller IC. The SiW1502 form factor is 7.0×7.0×1.0 mm package which is readily disposed within the interior volume of the gateway module 206 described herein.

In addition to the foregoing, the gateway module 206 of the invention further comprises a homeplug (or other power line carrier technology) interface module 460._The output 464 of the homeplug module 460 is coupled via, e.g., a standard 115 VAC, 60 Hz, single phase grounded electrical cord 464 to the power lines within in the site 226 (not shown) by simply plugging the gateway module 206 into a wall power outlet. This homeplug interface 460 and connection to the site wiring allows any equipment or device (e.g., appliances, home entertainment systems, HVAC control systems, etc.) to communicate with the gateway module directly without the need for additional wiring or air interfaces.

Adapter Modules

The adapter modules 208, 210, 212 of FIG. 2 provide self-install capability of the line power gateway of the present invention. These adapter modules are now described in detail with respect to FIG. 5.

Figure 5:
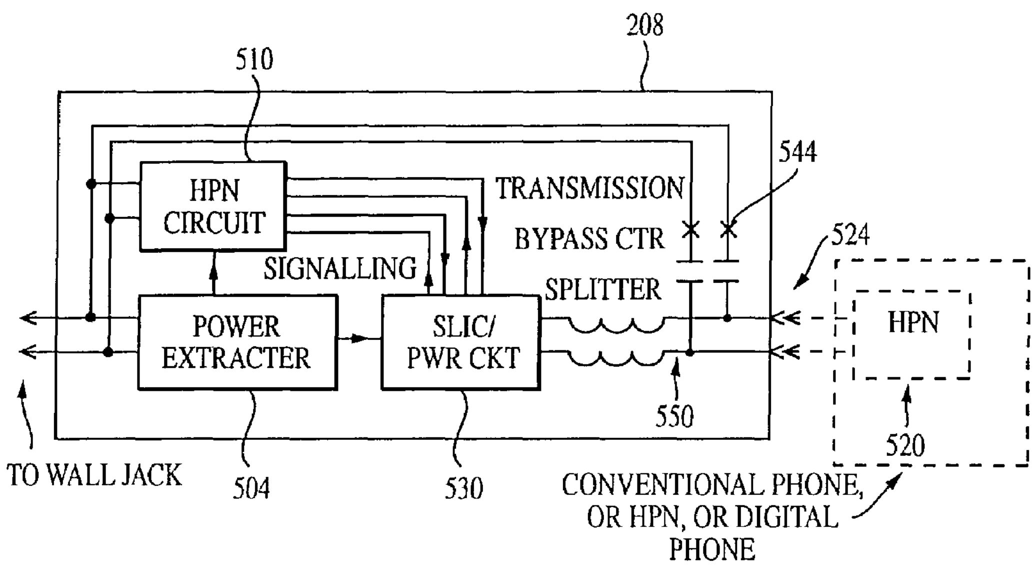
FIG. 5 is a block diagram including partial schematic of one embodiment of the jack adapter module according to the invention.

In the exemplary embodiment of FIG. 5, each adapter module is semi-permanently attached or "lockable" so as to prevent plugging any standard telephones or similar devices into the existing telephone wiring jacks 230, 232, 236, 238, which is necessary to prevent overloading the DC line power voltage present at the phone jacks. Instead, the adapter modules 208, 210, 212 of the present invention are plugged into the telephone jacks, and extract power from the telephone line 228 via a power extractor module 504 which is electrically coupled to the wall jack and a SLIC module 530. The adapter modules use this extracted power to provide power to an internal HPN circuit 510 within the respective modules, an/or to an HPN circuit 520 in a digital phone which is in turn plugged into the jack 524 of the module. The internal module HPN circuit 510 of each module extracts a derived phone line from the HPN module 440 in the gateway module 206 (FIG. 4), and drives the SLIC module 530 within each respective adapter module 208, 210, 212 to generate tip and ring lead signals to drive the module's phone jack 524.

Figure 5A:
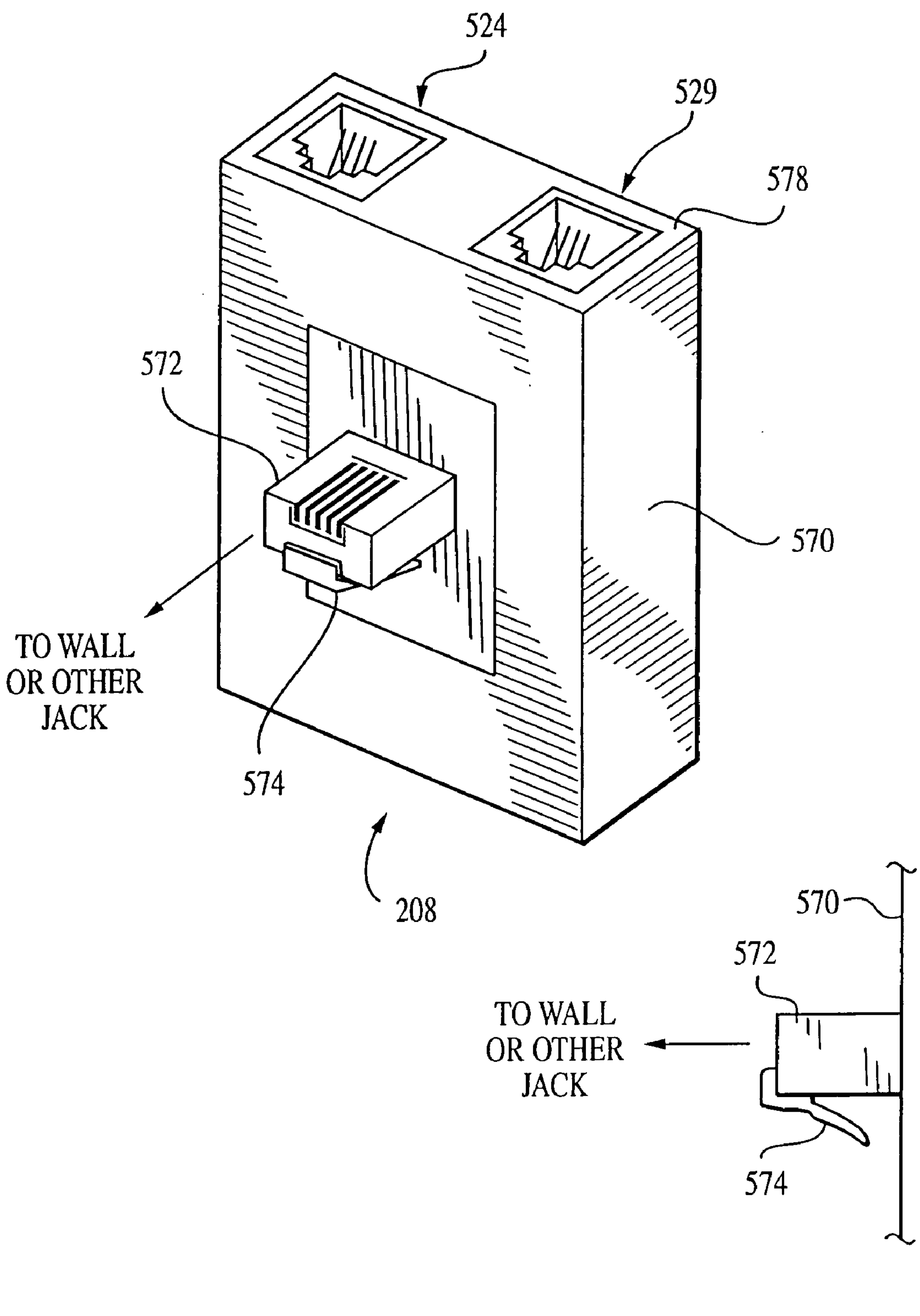
FIG. 5*a* is a perspective view of an exemplary embodiment of the jack adapter module of FIG. 5.

The adapter modules 208, 210, 212 of the present embodiment physically lock into respective ones of the jacks in the site 226, and the standard telephones (or other comparable devices such as standard HPN interface unit or digital phone) are plugged into the jacks 524 on the adapters as previously described. FIG. 5*a* illustrates one exemplary embodiment of the physical configuration of the adapter modules. As shown in FIG. 5*a*, the module 208, 210, 212 comprises a housing element 570 having a modular plug 572 with associated locking tab 574, and at least one modular jack 524 disposed on the upper surface 578 of the housing element 570. A second jack 529 may also be provided for any variety of different purposes, such as additional extension devices, RJ-11 interface, etc. The housing element 570 and modular plug 572 are configured such that the tab 574 is rendered inaccessible by the subscriber when the adapter is installed, thereby frustrating inadvertent or unintentional removal. It will be recognized, however, that while an obscured plug/tab arrangement is used in the illustrated embodiment, other methods of frustrating adapter module removal by the subscriber may also be employed, including for example the use of one or more fasteners (e.g., nut/bolt, screw, snap, or rivet) which mate the housing element 570 to the wall jack, adhesives, or even magnetic coupling between complementary magnets disposed in the housing element 570 and wall jack. As yet another alternative, the wall jack may actually be manufactured to include the adapter module circuitry as an integral component, such that the subscriber replaces the existing wall jack with the combined wall jack and adapter unit.

It will further be recognized, however, that the functions provided by the adapter modules 208, 210, 212 of the present invention need not necessarily be lockable or semi-permanent in nature; non-lockable modules may be used with equal success. However, the use of locking modules acts effectively as a safety device for the subscriber, to help frustrate inadvertent removal of the module(s) and subsequent insertion of a modular plug from a telephone or similar device into the wall jack.

The extension port jack 524 of the adapter module and its supporting circuitry is also adapted to automatically sense and adjust the function of the jack for a standard phone (SLIC output), a HPN Broad Band interface (HPN only output), or a new line powered digital phone (HPN output and a power feed). This sensing and adjustment is accomplished in the illustrated embodiment as described below.

To simplify the self-install process, the jack adapter module (or converter) senses the type of device plugged into the adapter module jack 524. There are generally three types of devices that may be used: (i) regular telephone equipment such as standard telephones (either wired or with cordless base station), answering machines, fax machines, caller ID devices, or analog modems; (ii) standard HPN (1.0 or 2.0) devices that are AC coupled and include any HPN to PC interface modules, or printer or other peripherals that have an HPN input; or (iii) a new line powered single or multi-line HPN telephone (or other desired low-power function), such devices using DC power as well as communicating via HPN signals.

The typical automatic sensing and adapter module configuration starts with the SLIC always feeding a DC battery voltage of approximately 10 VDC on T/R.

If a conventional device is plugged into the jack 524 and goes off hook and draws loop current, the SLIC 530 and HPN circuit 510 of the adapter module looks for an HPN signal from the extension device, and if none is present, will determine that the device is a conventional phone or similar device. If the extension device is conventional, the adapter module communicates to the HPN circuitry (e.g., chip) to request dial tone through the gateway to the serving CO. Once the requested dial tone signal is detected from the CO, the SLIC 530 generates dial tone for the local phone which can then dial the desired number. When the off hook condition appears, the HPN signals are blocked by a relay K1 and associated switches 544, which forms a splitter 550 within the module.

Figure 5B:
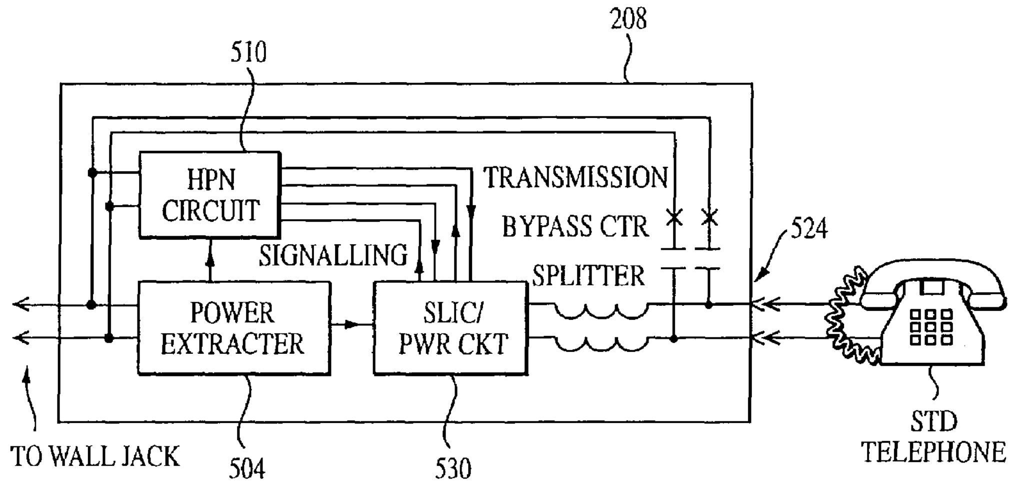
FIG. 5*b* is a block diagram including partial schematic illustrating a first (standard telephone) operating mode of the adapter module of FIG. 5.
Figure 5C:
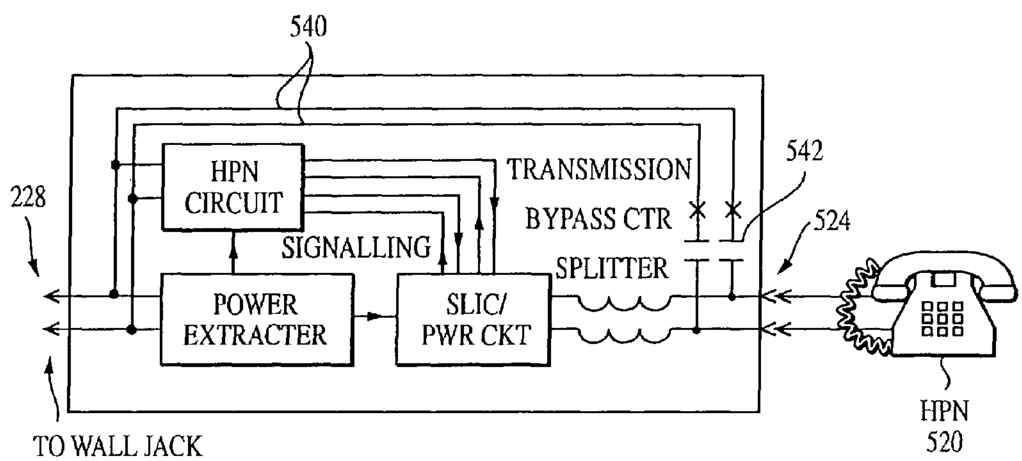
FIG. 5*c* is a block diagram including partial schematic illustrating a second (HPN bypass) operating mode of the adapter module of FIG. 5.

If the extension device is a standard HPN device with no DC path, the HPN circuitry will sense the HPN signal from the device, and bypass the HPN signal around the adapter module circuitry as shown in FIG. 5*c* herein.

Figure 5D:
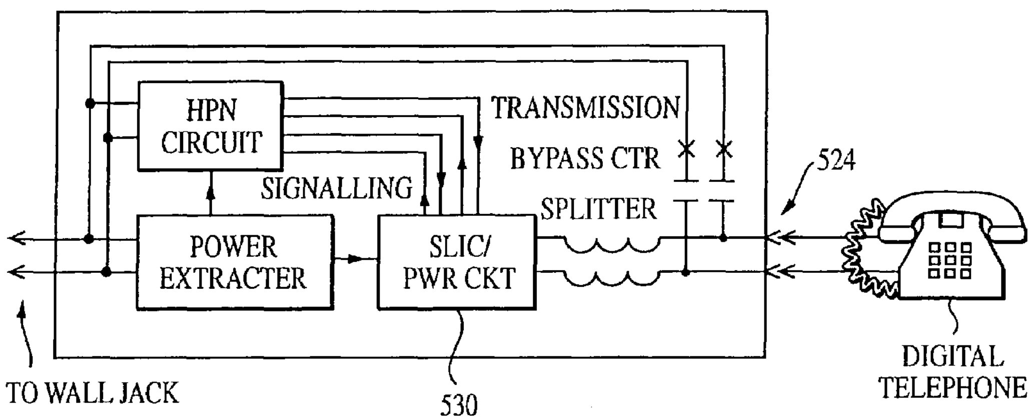
FIG. 5*d* is a block diagram including partial schematic illustrating a third (digital multi-line line powered telephone or equivalent) operating mode of the adapter module of FIG. 5.

If the extension device is a new digital line powered HPN single or multi-line telephone, the SLIC loop current sensor will sense DC current flow and the adapter module HPN circuitry will detect an HPN request which will then bypass the HPN phone signal to the gateway module 206, and switch the SLIC 530 to the power feed mode to power the phone, as illustrated in FIG. 5*d* herein.

Accordingly, there are three states or modes associated with the automatic sensing apparatus of the adapter module jack 524 of the present embodiment: (i) standard telephone interface; (ii) HPN bypass; and (iii) line powered digital multi-line telephone.

For standard telephones, the power extractor module 504 obtains power from the line (wall jack), powers the HPN circuitry 510 of the module 206 to obtain a phone circuit with send/receive transmission, and provides signaling (on/off hook and ringing). The HPN 510 drives the low power SLIC module 530, which generates the 10 VDC battery feed voltage for the telephone, as well as generating the ringing voltage to ring the phone. This configuration is illustrated in FIG. 5*a*. For the standard telephone interface, the adapter module further includes means for setting or selecting the line (of the multiple derived lines) to connect to the adapter's phone jack. In one embodiment, this means comprises a multi-position selector switch, although other configurations (e.g., automatic selection based on parametric sampling, algorithmic control, etc.) may be used as well. Since each HPN circuit has a unique address, the line selection may be selected at the gateway upon installation as well.

For the HPN only application of the module 206, the line HPN signal is simply bypassed from the installed line 228 (wall jack) to the adapter phone jack 524 via a bypass circuit 540 and in-line capacitors 542 as shown in FIG. 5*b*.

For the line powered digital multi-line telephone (or similar device), having a digital HPN signal present at each jack is ideal. In the third mode of operation of the adapter module 206 (FIG. 5*c*), the HPN signal is bypassed to the digital phone jack 524, and the feed or SLIC circuit 530 switches modes and feeds power to the digital phone. Since the digital phone can be a multi-line phone, it is equivalent to a key system. This is ideal for example in a small office, where multiple lines with multiple phones are used. Other lower cost digital phones or devices can be set to the desired derived phone line such as, for example, in a teenager's room or other home application.

Figure 5E:
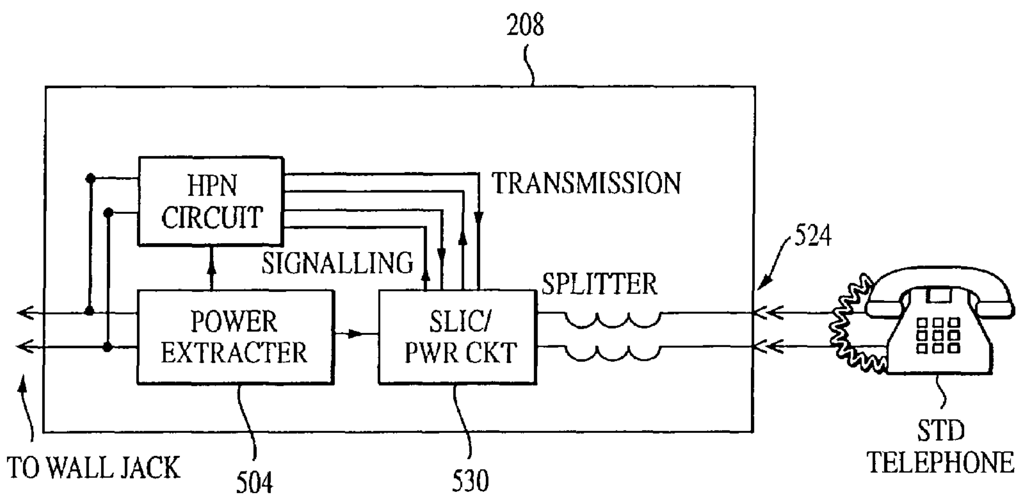
FIG. 5*e* is a block diagram including partial schematic illustrating a first low-cost alternate embodiment (adapted for a standard telephone) of the adapter module of FIG. 5.

Alternatively, it will be recognized that the foregoing modalities of the adapter module(s) 208, 210, 212 of the present invention may be embodied as three different low-cost jack adapters, each low-cost adapter providing one of the foregoing functions. FIG. 5*e* illustrates one exemplary embodiment of such a low-cost adapter module 594, configured for use with a standard telephone (first operating mode described above). The configuration of this module 594 is generally similar to that of the module 208 of FIG. 5, with the exception that the contacts 542 and bypass pathway 540 are removed since the need for such components is obviated.

Figure 5F:
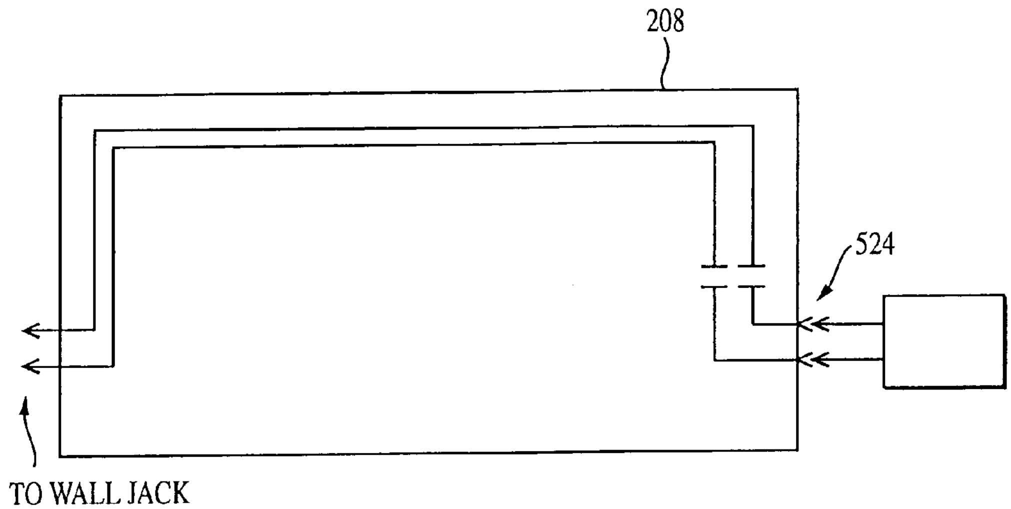
FIG. 5*f* is a block diagram including partial schematic illustrating a second low-cost alternate embodiment (adapted for HPN bypass) of the adapter module of FIG. 5.

FIG. 5*f* illustrates a second embodiment of the "low-cost" adapter module 596 adapted for use in the "HPN only" mode previously described. Here, the adapter module simply comprises a current path 540 with contacts 542 disposed between the extension device jack 524 and the wall jack.

Figure 5G:
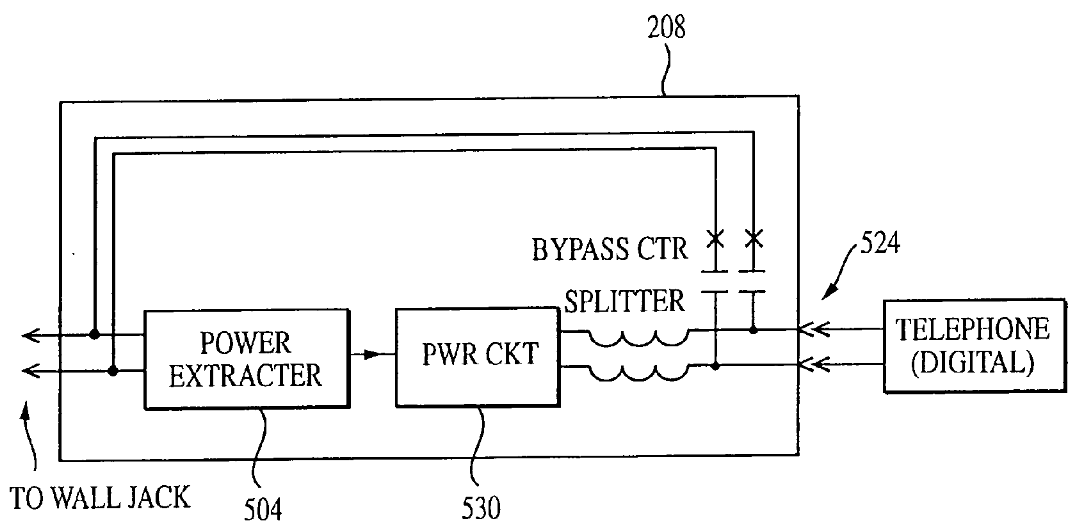
FIG. 5*g* is a block diagram including partial schematic illustrating a third low-cost alternate embodiment (adapted for a digital telephone) of the adapter module of FIG. 5.

FIG. 5*g* illustrates a third embodiment of the low-cost adapter module, configured for use with digital telephones as discussed above. In this embodiment, the adapter module 598 comprises a power extractor 504, power circuit 597, bypass pathway 540 with contacts 542, and splitter arrangement. The HPN circuitry 510 of the embodiment of FIG. 5 is removed in that it is not required, and the SLIC 530 of FIG. 5 is replaced with a simplified power supply circuit which supplies power directly to the extension device as shown in FIG. 5*g*.

Other combinations or configurations may also be used, such combinations and configurations being readily implemented by those of ordinary skill.

Method of Installation

Figure 6:
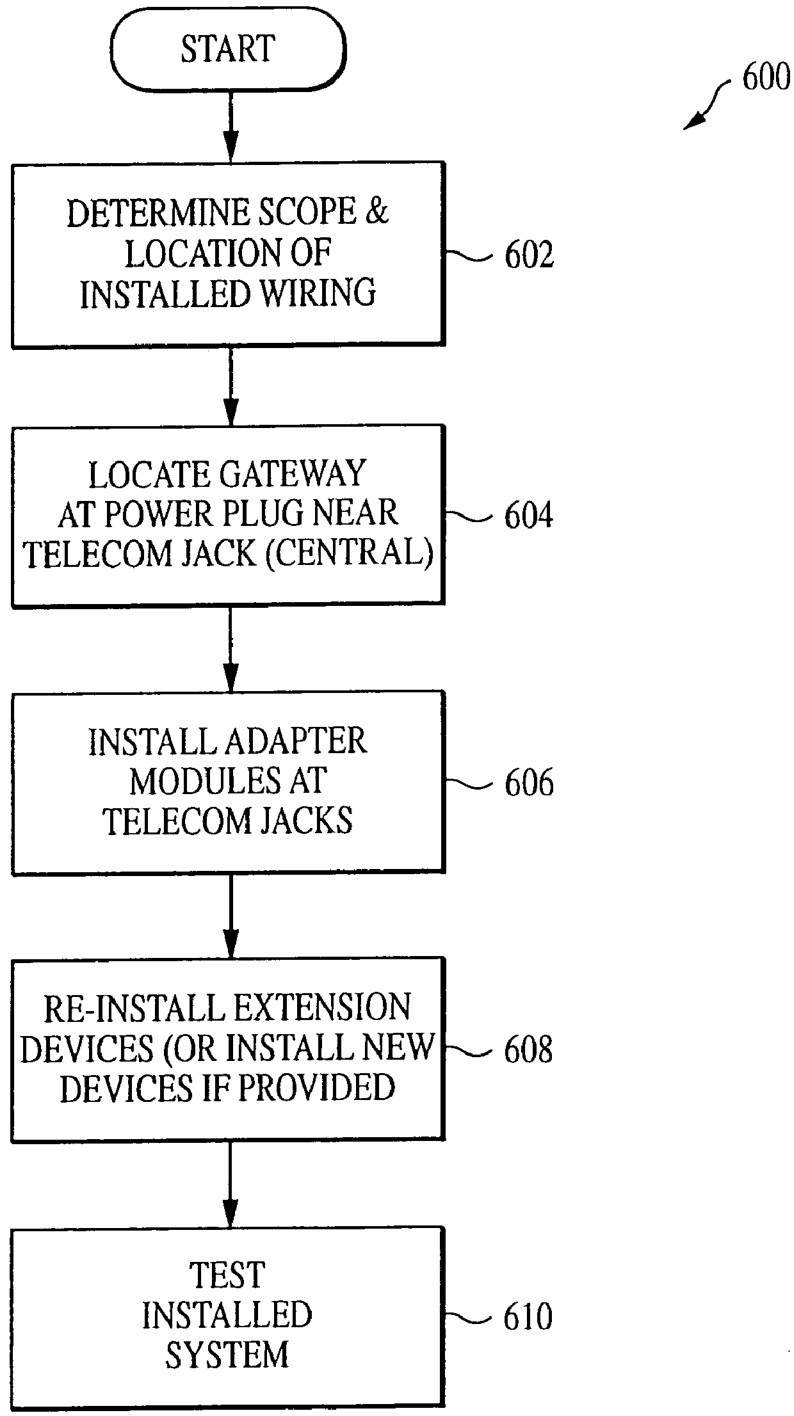
FIG. 6 is a logical flow diagram illustrating one embodiment of the method of installing the system of FIG. 2.

Referring now to FIG. 6, the method of installing the aforementioned system 200 and associated components is described in detail. It is noted that while the following description is cast in terms of the system of FIG. 2 as installed in a typical residential structure, the broader method of the invention is equally applicable to other configurations and types of sites.

As shown in FIG. 6, the method 600 generally comprises first determining scope and location of telecommunications wiring and any HPN systems within the site 226, including the number of wall jacks present therein (step 602).

Next, the gateway module 206 is positioned in a location having access to both a telecommunications wiring jack and a power supply jack (e.g., wall plug) per step 604. Specifically, the gateway module's phone line port is connected (via appropriate cabling) to the telephone jack, and the module's power plug 464 is connected to the local power supply jack. The gateway module is, in one embodiment, sized such that it's weight and bulk is mechanically supported by the power plug when the module is plugged into the latter.

Per step 606, adapter modules 208, 210, 212 are then positioned at respective ones of each of the remaining telephone jacks throughout the site 226, the adapter modules being plugged into the wall jacks such that they lock into place (if so equipped) as previously described. It is noted that not every telecommunications line wall jack must be outfitted with an adapter module 208, 210, 212; however, those not so equipped should not have a standard telephone or other device installed, since the potential for DC line voltage overload exists as previously described.

Next, in step 608, the various extension devices (i.e., standard telephones, HPN gateways, digital multi-line phones, etc) are plugged into the jacks 524 of their respective adapter modules 208, 210, 212. The flexibility inherent with the present invention is underscored here, since any of the foregoing devices can be indiscriminately plugged into the adapter module jack 524 of any adapter module without any particular configuration restrictions or additional wiring requirements (other than setting the line selection means associated with the applicable adapter module when a standard phone is plugged into the jack 524 to permit selection between multiple derived lines).

Lastly, in step 610, the system 200 is tested to ensure proper functionality. Such testing can be optionally built into the system (e.g. a self-test algorithm and supporting hardware adapted to run and provide the subscriber test results upon system installation and/or startup), or performed by external test equipment as is well understood in the telecommunications art. Self-test performed automatically by the system when installed, with simple instructions to the user, is optimal, since it reduces the installation burden on the subscriber. Parameters to be tested may include, for example, the data rate across the Telco line/DSL module, proper line voltage regulation under normal and loss-of-power conditions by the LPCU 204, proper communication between the gateway module controller unit 422 and the LPCU 204, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Apparatus for providing power to at least one subscriber at a premises via a telecommunications line, comprising:

a power converter operatively coupled to said telecommunications line and adapted to generate a voltage on said line;

a gateway module having modulator/demodulator apparatus operatively coupled to said telecommunications line, said module being adapted to extract power from said voltage on said telecommunications line;

wherein said gateway module further comprises a power line interface in data communication with said modulator/demodulator, said power line interface adapted to transmit data over power distribution wiring of said premises local to said gateway module; and at least one adapter unit operatively coupled to said telecommunications line and further configured to extract power from said voltage and provide said power to an extension device.

2. The apparatus of claim 1, wherein said gateway module further comprises a controller operatively coupled to said power converter, said controller cooperating with said power converter to regulate the power provided via said telecommunications line.

3. The apparatus of claim 2, wherein said controller communicates with said power converter via said telecommunications line to regulate at least the voltage applied to said line by said power converter.

4. The apparatus of claim 2, wherein said at least one adapter unit is semi-permanently attached to a telephone jack.

5. The apparatus of claim 2, wherein said gateway module further comprises a wireless interface in data communication with said modulator/demodulator and adapted to at least receive radio frequency signals from a remote device.

6. The apparatus of claim 2, wherein said at least one adapter unit is adapted to automatically sense and adjust the function of a telephone jack, thereby allowing it to be self-installable by said at least one subscriber.

7. The apparatus of claim 6, wherein said gateway module is self-installable by said at least one subscriber.

8. The apparatus of claim 7, wherein said power converter further comprises a ground fault detector circuit adapted to detect faults on said telecommunications line.

9. A digital subscriber line (DSL) apparatus, comprising:

modulator/demodulator apparatus adapted to receive and transmit signals over at least one telecommunications line;

power extraction circuitry operatively coupled to said telecommunications line and adapted to generate power for said modulator/demodulator apparatus from voltage applied to said lines; and an interface module operatively coupled to a dedicated premises power line and said modulator/demodulator apparatus, said interface module being adapted to transmit and receive data over said power line.

10. The DSL apparatus of claim 9, wherein said power line comprises a single-phase alternating current (AC) power distribution line.

11. The DSL apparatus of claim 10, wherein said interface module is compliant with the HomePlug Powerline Alliance 1.0 Specification.

12. The DSL apparatus of claim 9, further comprising a local network interface adapted to communicate with at least one other node in data communication with said DSL apparatus.

13. The DSL apparatus of claim 12, wherein said local network interface comprises a home phone network (HPN) gateway adapted to communicate with said at least one node via installed telephone wiring.

14. The DSL apparatus of claim 13, further comprising a wireless interface in data communication with said at least one telecommunications line and said modulator demodulator apparatus, said wireless interface being configured to receive data from a portable device and communicate said data to said modulator/demodulator apparatus.

15. The DSL apparatus of claim 14, wherein said wireless interface is compliant with the Bluetooth 2.4 GHz wireless standard.

16. The DSL apparatus of claim 14, wherein said wireless interface is compliant with IEEE Std. 802.11.

17. The DSL apparatus of claim 14, wherein said wireless interface utilizes direct sequence spread spectrum having a pseudo-noise (pn) spreading code.

18. The DSL apparatus of claim 9, further comprising a wireless interface in data communication with said at least one telecommunications line and said modulator demodulator apparatus, said wireless interface being configured to receive data from a portable device and communicate said data to said modulator/demodulator apparatus.

19. The DSL apparatus of claim 9, wherein said apparatus is adapted to receive signals having frequencies down to approximately 200 Hz.

20. A method of providing power over a communications line to a subscriber, comprising:

providing a power source operatively coupled to a first node of said line;

providing a power extractor operatively coupled to a second node of said line;

generating a voltage on said line using said power source;

generating power at said second node using said voltage and said power extractor;

providing a plurality of power extractors at respective ones of a plurality of additional nodes, said additional nodes being in electrical communication with said second node at the location of said subscriber;

extracting power from said line using said plurality of power extractors;

distributing said extracted power to respective ones of a plurality of extension devices coupled to respective ones of said power extractors;

detecting ground faults present on said telecommunications line; and in response to said detected faults, controlling the operation of said power source.

21. The method of claim 20, further comprising regulating said voltage applied to said line based at least in part on signals generated at said second node.

22. The method of claim 21, further comprising adjusting said voltage applied to said line based at least in part on the distance between said first node and said second node.

23. The method of claim 20, further comprising adjusting said voltage applied to said line based at least in part on the distance between said first node and said second node.

24. The method of claim 20, further comprising controlling the polarity of said voltage generated on said telecommunications line in order to mitigate the corrosion thereof.

25. Telecommunications apparatus, comprising:

a telephonic device;

line power circuitry in electrical communication with said telephonic device, said circuitry adapted to derive power from a telecommunications line to which said apparatus is operatively coupled, and provide said power to said telephonic device;

wherein said telecommunications line carries at least one derived telephone line; and selection apparatus adapted to select one or more of said at least one derived telephone lines, wherein said selection apparatus comprises an address generator, said address generator generating at least one unique address, said at least one unique address being used to select said derived telephone line associated with said telecommunications apparatus.

26. The apparatus of claim 25, wherein said telephonic device comprises a multi-line telephone.

27. The apparatus of claim 25, wherein said line power circuitry is further adapted to:

(i) automatically sense the configuration of said telephonic device; and (ii) alter the operation of said line power circuitry in response to said sensed configuration.

28. Apparatus for providing power to at least one subscriber via a telecommunications line, comprising:

a low frequency splitter operatively coupled to said telecommunications line;

a power conversion circuit adapted to generate electrical potential and apply such potential to said telecommunications line via said splitter; and a power control circuit operatively coupled to said low frequency splitter and said power conversion circuit, said control circuit adapted to control said electrical potential applied to said line based at least in part on one or more parameters.

29. The apparatus of claim 28, wherein said low frequency splitter comprises a plurality of inductors.

30. The apparatus of claim 29, wherein the inductance values of said inductors are selected so as to provide a resonance condition for optimal response at a designated frequency.

31. The apparatus of claim 29, wherein said power generation circuit provides at least a portion of the total inductance of said apparatus.

32. The apparatus of claim 28, further comprising ground fault detection circuitry operatively coupled to said power conversion circuit such that the output of said power conversion circuit is controlled under ground fault conditions.

33. The apparatus of claim 28, further comprising a regulator operatively coupled to said power conversion circuit and adapted to control the magnitude of said electrical potential.

34. The apparatus of claim 33, wherein said regulator is further adapted to control the polarity of said voltage.

35. Apparatus for providing power to at least one subscriber via a telecommunications line, comprising:

power conversion means operatively coupled to said telecommunications line for generating a voltage on said line;

modulator/demodulator means operatively coupled to said telecommunications line;

power line interface means adapted to transmit data over at least one premises dedicated power line local to said gateway module;

means for extracting power from said voltage on said telecommunications line; and at least one adapter unit operatively coupled to said telecommunications line and further configured to extract power from said voltage and provide said power to an extension device.

36. The apparatus for providing power to at least one subscriber via a telecommunications line of claim 35, wherein said at least one adapter unit is semi-permanently attached to a fixture.

37. The apparatus of claim 36, further comprising:

sensing means in said at least one adapter unit, said sensing means adapted to automatically adjust the function of a telephone jack.

38. The apparatus of claim 37, further comprising:

detecting means for detecting ground faults present on said telecommunications line.

39. The apparatus of claim 38, further comprising:

address generating means for generating at least one unique address being used to select a derived telephone line associated with said apparatus for providing power to at least one subscriber via a telecommunications line.

* * * * *